(12) United States Patent
Thomas et al.

(10) Patent No.: US 6,711,219 B2
(45) Date of Patent: Mar. 23, 2004

(54) INTERFERENCE CANCELLATION IN A SIGNAL

(75) Inventors: John K. Thomas, Erie, CO (US); Woody Kober, Aurora, CO (US); Eric Olson, Boulder, CO (US); Kent Krumvieda, Westminister, CO (US)

(73) Assignee: Tensorcomm, Incorporated, Westminster, CO (US)

( * ) Notice: Subject to any disclaimer, the term of this patent is extended or adjusted under 35 U.S.C. 154(b) by 141 days.

(21) Appl. No.: 09/988,218

(22) Filed: Nov. 19, 2001

(65) Prior Publication Data

US 2004/0017867 A1 Jan. 29, 2004

Related U.S. Application Data

(60) Provisional application No. 60/326,199, filed on Oct. 2, 2001, provisional application No. 60/325,215, filed on Sep. 28, 2001, and provisional application No. 60/251,432, filed on Dec. 4, 2000.

(51) Int. Cl.[7] .................................................. H03D 1/04
(52) U.S. Cl. ....................................................... 375/346
(58) Field of Search ................................ 375/346, 148, 375/150, 347, 316, 293, 343; 455/269, 272, 273; 370/335, 342, 320, 441

(56) References Cited

U.S. PATENT DOCUMENTS

| | | |
|---|---|---|
| 5,787,130 A | 7/1998 | Kotzin et al. |
| 5,872,540 A | 2/1999 | Casabona et al. |
| 5,872,776 A | 2/1999 | Yang |
| 5,930,229 A | 7/1999 | Yoshida et al. |
| 5,953,369 A | 9/1999 | Suzuki |
| 5,995,499 A | 11/1999 | Hottinen et al. |
| 6,002,727 A | 12/1999 | Uesugi |

(List continued on next page.)

OTHER PUBLICATIONS

Behrens, R.T., L.L. Scharf, "Parameter Estimation in the Presence of Low–Rank Noise", Proceedings of the Twenty–second Asilomar Conference on Signals, Systems, and Computers, Pacific Grove, CA, Nov. 1988.
Best, Roland E., Phase Locked Loops: Design, Simulation, and Applications, 4th edition, McGraw Hill.
Cheng U., et al., "Spread–Sprectrum Code Acquistion in the Presence of Doppler shift and data modulation", IEEE Transactions on Communications vol. 38, No. 2, Feb. 1990.
Duel–Hallen, Alexandra, "Decorrelating decision–feedback multiuser detector for synchronous code–divison multiple–access channel", IEEE Trans. Common., vol. 41, No. 2, pp. 285–290, Feb. 1993.
Garg, V.K. et al., "Wireless and Personal Communications Systems", Prentice–Hall, 1996.
Iltis, Ronald A., et. al., MultiUser Detection of Quasisynchronous CDMA signals using linear decorrelators, IEEE Transactions on Communications, vol. 44, No. 11, Nov. 1996.

(List continued on next page.)

Primary Examiner—Khai Tran

(57) ABSTRACT

A communication system having a forward link and/or reverse link comprising: at least one base station which transmits multiple radio frequency (RF) signals; and a mobile station, the mobile station including: a receiver for receiving the RF signals; means for converting the RF signal to an intermediate frequency (IF) signal; means for sampling the IF signal to generate a digital signal, the digital signal having a data component and an interference component; means for canceling co-channel and or cross-channel interference in the digital signal by projecting the IF signal into a subspace orthogonal to a subspace of the interference component and multiplying this projection with the digital signal; and means for acquisition and tracking of the digital signal.

72 Claims, 8 Drawing Sheets

Projections onto the signal and interference subspaces

U.S. PATENT DOCUMENTS

| | | | |
|---|---|---|---|
| 6,014,373 A | | 1/2000 | Schilling et al. |
| 6,018,317 A | * | 1/2000 | Dogan et al. ............... 342/378 |
| 6,088,383 A | | 7/2000 | Suzuki et al. |
| 6,115,409 A | | 9/2000 | Upadhyay et al. |
| 6,127,973 A | | 10/2000 | Choi et al. |
| 6,131,013 A | | 10/2000 | Bergstrom et al. |
| 6,137,788 A | | 10/2000 | Sawahashi et al. |
| 6,141,332 A | | 10/2000 | Lavean |
| 6,154,443 A | | 11/2000 | Huang et al. |
| 6,157,685 A | | 12/2000 | Tanaka et al. |
| 6,157,847 A | | 12/2000 | Buehrer et al. |
| 6,166,690 A | | 12/2000 | Lin et al. |
| 6,172,969 B1 | | 1/2001 | Kawakami et al. |
| 6,175,587 B1 | | 1/2001 | Madhow et al. |
| 6,192,067 B1 | | 2/2001 | Toda et al. |
| 6,201,799 B1 | | 3/2001 | Huang et al. |
| 6,215,812 B1 | | 4/2001 | Young et al. |
| 6,222,828 B1 | | 4/2001 | Ohlson et al. |
| 6,230,180 B1 | | 5/2001 | Mohamed |
| 6,233,229 B1 | | 5/2001 | Ranta et al. |
| 6,256,336 B1 | | 7/2001 | Rademacher et al. |
| 6,259,688 B1 | | 7/2001 | Schilling et al. |
| 6,278,726 B1 | | 8/2001 | Mesecher et al. |
| 6,282,231 B1 | | 8/2001 | Norman et al. |
| 6,282,233 B1 | | 8/2001 | Yoshida |
| 6,285,316 B1 | | 9/2001 | Nir et al. |
| 6,304,618 B1 | | 10/2001 | Hafeez et al. |
| 6,324,159 B1 | | 11/2001 | Mennekens et al. |
| 6,377,636 B1 | | 4/2002 | Paulraj et al. |
| 6,430,216 B1 | * | 8/2002 | Kober et al. ............... 375/148 |
| 6,459,693 B1 | | 10/2002 | Park et al. |

OTHER PUBLICATIONS

Kaplan, Elliot D., Editor, UnderstandingGPS: Principles and Applications, Artech House.

Kohno, Rhuji and Mitsutoshi Hatori, "Cancellation techniques of co–channel interference in asychronous spread spectrum multiple access systems", Electronics and Commom. in Japan. vol, 66–A, No. 5, pp. 20–29, May 1983.

Lupas, Ruxandra and Sergio Verdu, "Linear multiuser detectors for synchronous code–division multiple–access channels", IEEE Trans. Info. Theory, vol. 35, No. 1, pp. 123–136, Jan. 1989.

Lupas, Ruxandra and Sergio Verdu, "Near–far resistance of multiuser detectors in asynchronous channels", IEEE Trans. Common., vol. 38, No. 4, pp. 496–508, Apr. 1990.

Mitra U., et. al., "Adaptive Decorrelating Detectors for CDMA systems", Accepted for publication in the Wireless Personal Communications Journal, May 1995.

Mitra U., et. al., "Adaptive Receiver algorithms for Near–Far Resistant CDMA", To appear in IEEE Transaction on Communications, Apr. 1995.

Price, R. and Green, P. E., Jr. "A Communication Technique for Multipath Channels," _Proc IRE_ vol. 46, pp. 555–570, Mar., 1958.

Rapport, T.S., "Wireless Communications, Principles and Practice"; Prentice–Hall, 1996.

Scharf L.L., B. Friedlander, Matched Subspace Detectors, IEEE Trans Signal Proc SP–42:8,pp. 2146–2157 (Aug. 1994).

Scharf, L.L., Statistical Signal Processing: Detection, Estimation, and Time Series Analysis, Addision–Wesley Publishing Co., 1991.

Schlegel, C. et. al., "Coded Asynchronous CDMA and its Efficient Detection", IEEE Transactions on Information Theory, vol. 44, No. 7, Nov. 1998.

Schlegal, C. et. al., "Projection Receiver: A New Efficient Multi–User Detector", IEEE 1995.

Schlegel, C., Zengjun Xiang, "A new projection receiver for coded Synchronous Multi–User CDMA Systems".

Schneider, Kenneth S., "Optimum detection of code division multiplexed signals", IEEE Trans. Aerospace and Electronic Systems, vol. AES–15, No. 1, pp. 181–185, Jan. 1979.

Stimson, G.W., "An Introduction to Airborne Radar"; SciTech Publishing Inc., 1998.

Verdu, Sergio. "Minimum probability of error for asynchronous Gaussian multiple–access channels", IEEE Trans. Info. Theory, vol. IT–32, No. 1, pp. 85–96, Jan. 1986.

Viterbi, A.J., "CDMA, Principles of Spread Spectrum Commmunication", Addison Wesley, 1995.

Vitterbi, Andrew J., "Very low rate convolutional codes for maximum theoretical performance of spread–spectrum multiple–access channels", IEEE J. Select. Areas Common., vol. 8, No. 4, pp. 641–649, May 1990.

B. Widrow, S. Stearns, Adaptive Signal Processing, Prentice–Hall, Signal Processing Series, (1985).

Xie, Zhenhua, Robert T. Short and Craig K. Rushforth, "A family of suboptimum detectors for coherent multiuser communications", IEEE J. Select. Areas Common., vol. 8, No. 4, pp. 683–690, May 1990.

Zheng, Fu–Chun, et al., "On the performance of Near–Far Resistant CDMA Detectors in the Presence of Synchronization Errors", IEEE Transactions on Communications, vol. 43, No. 12, Nov. 1995.

* cited by examiner

(PRIOR ART)

(PRIOR ART)

(PRIOR ART)

(PRIOR ART)

Projections onto the signal and interference subspaces

Estimation of Doppler, code, phase offsets for all multipath signals of a single source

Interference mitigation architecture

Simultaneous mitigation of both cross and co-channel interference

INTERFERENCE CANCELLATION IN A SIGNAL

CROSS-REFERENCE TO RELATED APPLICATIONS

This application makes reference to U.S. Provisional Patent Application No. 60/326,199 entitled "Interference Cancellation in a Signal," filed Oct. 2, 2001; U.S. Provisional Patent Application No. 60/251,432, entitled "Architecture for Acquiring, Tracking and Demodulating Pseudorandom Coded Signals in the Presence of Interference," filed Dec. 4, 2000; U.S. patent application Ser. No. 09/612,602, filed Jul. 7, 2000; U.S. patent application Ser. No. 09/137,183, filed Aug. 20, 1998; U.S. Provisional Patent Application No. 60/325,215, entitled "An Apparatus for Implementing Projections in Signal Processing Applications," filed Sep. 28, 2001; U.S. Provisional Patent Application No. 60/325,215, entitled "Construction of an Interference Matrix for a Coded Signal Processing Engine," filed Nov. 16, 2001; and to U.S. patent application Ser. No. 09/988,219, entitled "A Method and Apparatus for Implementing Projections in Signal Processing Applications," filed Nov. 19, 2001. The entire disclosure and contents of these applications are hereby incorporated by reference.

BACKGROUND OF THE INVENTION

1. Field of the Invention

The present invention relates generally to an architecture for a Coded Signal Processing Engine (CSPE) that is designed for interference cancellation in the reception of coded signals. More particularly, the CSPE may be used for acquiring, tracking and demodulating pseudorandom (PN) coded signals in the presence of interference from other PN coded signals in a CDMA system.

2. Description of the Prior Art

In spread spectrum systems, whether it is a communication system, a Global Positioning System (GPS) or a radar system, each transmitter may be assigned a unique code and in many instances each transmission from a transmitter is assigned a unique code. The code is nothing more than a sequence (often pseudorandom) of bits. Examples of codes include the Gold codes (used in GPS—see Kaplan, Elliot D., Editor, *Understanding GPS: Principles and Applications*, Artech House 1996), Barker codes (used in radar—see Stimson, G. W., "*An Introduction to Airborne Radar*", SciTech Publishing Inc., 1998) and Walsh codes (used in communications systems like CDMAOne—See IS-95). These codes may be used to spread the signal so that the resulting signal occupies some specified range of frequencies in the electromagnetic spectrum or the codes may be superimposed on another signal which might also be a coded signal.

Assigning a unique code to each transmitter allows the receiver to distinguish between different transmitters. An example of a spread spectrum system that uses unique codes to distinguish between transmitters is a GPS system.

If a single transmitter has to broadcast different messages to different receivers, such as a base-station in a wireless communication system broadcasting to different mobiles, one may use codes to distinguish between the messages for each mobile. In this scenario, each bit for a particular user is encoded using the code assigned to that user. By coding in this manner, the receiver, by knowing its own code, may decipher the message intended for it from the composite signal transmitted by the transmitter.

In some communication systems, a symbol is assigned to a sequence of bits that constitute a message. For example, a long digital message may be grouped into sets of M bits and each one of these sets of M bits is a assigned to a symbol. For example, if M=6, then each set of 6 bits may assume one of $2^6$=64 possibilities. One such possibility is 101101. Such a system would broadcast a unique waveform, called a symbol, to indicate to the receiver a particular sequence of bits. For example, the symbol $\alpha$ might denote the sequence 101101 and the symbol $\beta$ might denote the sequence 110010. In the spread spectrum version of such a system, the symbols are codes. An example of such a communication system is the mobile to base-station link of CDMAOne.

In some instances, such as in a coded radar system, each pulse is assigned a unique code so that the receiver is able to distinguish between the different pulses based on the codes.

Of course, all of these techniques may be combined to distinguish between transmitters, messages, pulses and symbols all in one single system. The key idea in all of these coded systems is that the receiver knows the codes of the message intended for it and by applying the codes correctly to the received signal, the receiver may extract the message intended for it. However, such receivers are more complex than receivers that distinguish between messages by time and/or frequency alone. The complexity arises because the signal received by the receiver is a linear combination of all the coded signals present in the spectrum of interest at any given time. The receiver has to be able to extract the message intended for it from this linear combination of coded signals.

The following section presents the problem of interference in linear algebraic terms followed by a discussion of the current, generic (baseline) receiver.

Let H be a vector containing the spread signal from source number 1 and let $\theta_1$ be the amplitude of the signal from this source. Let $s_i$ be the spread signals for the remaining sources and let $\phi_i$ be the corresponding amplitudes. Suppose the receiver is interested in source number 1, the signals from the other sources may be considered to be interference. Then, the received signal is:

$$y = H\theta_1 + s_2\phi_2 + s_3\phi_3 + \ldots + s_p\phi_p + n \quad (1)$$

where n is the additive noise term, and p is the number of sources in the CDMA system. Let the length of the vector y be N, where N is the number of points in the integration window. This number N is selected as part of the design process as part of the trade-off between processing gain and complexity. A window of N points of y will be referred to as a segment.

In a wireless communication system, the columns of the matrix H represent the various coded signals and the elements of the vector $\theta$ are the powers of the coded signals. For example, in the base-station to mobile link of a CDMAOne system, the coded signals might be the various channels (pilot, paging, synchronization and traffic) and all their various multipath copies from different base-stations. In the mobile to base-station link, the columns of the matrix H might be the coded signals from the mobiles and their various multipath copies.

In a GPS system, the columns of the matrix H are the coded signals being broadcast by the GPS satellites at the appropriate code, phase and frequency offsets.

In an array application, the columns of the matrix are the steering vectors or equivalently the array pattern vectors. These vectors characterize the relative phase recorded by each antenna in the array as a function of the location and motion dynamics of the source as well as the arrangement of the antennas in the array. In the model presented above, each column of the matrix H signifies the steering vector of a particular source.

Equation (1) may now be written in the following matrix form:

$$y = H\theta + S\phi + n \quad (2)$$

$$= [HS]\begin{bmatrix}\theta \\ \phi\end{bmatrix} + n$$

where
H: spread signal matrix of the source that the receiver is demodulating
θ: amplitude vector of the source that the receiver is demodulating
S=[$s_2 \ldots s_p$]: spread signal matrix of all the other sources, i.e., the interference
φ=[$\phi_2 \ldots \phi_p$]: interference amplitude vector
Receivers that are currently in use correlate the measurement, y, with a replica of H to determine if H is present in the measurement. If H is detected, then the receiver knows the bit-stream transmitted by source number 1. Mathematically, this correlation operation is:

$$\text{correlation function} = (H^T H)^{-1} H^T y \quad (3)$$

where $^T$ is the transpose operation.

Substituting for y from equation (2) illustrates the source of the power control requirement:

$$(H^T H)^{-1} H^T y = (H^T H)^{-1} H^T (H\theta + S\phi + n) \quad (4)$$

$$= (H^T H)^{-1} H^T H\theta + (H^T H)^{-1} H^T S\phi + (H^T H)^{-1} H^T n$$

$$= \theta + (H^T H)^{-1} H^T S\phi + (H^T H)^{-1} H^T n$$

It is the middle term, $(H^T H)^{-1} H^T S\phi$, in the above equation that results in the near-far problem. If the codes are orthogonal, then this term reduces to zero, which implies that the receiver has to detect θ in the presence of noise (which is $(H^T H)^{-1} H^T n$) only. It is easy to see that as the amplitude of the other sources increase, then the term $(H^T H)^{-1} H^T S\phi$ contributes a significant amount to the correlation function, which makes the detection of θ more difficult.

The normalized correlation function, $(H^T H)^{-1} H^T$, defined above, is in fact the matched filter and is based on an orthogonal projection of y onto the space spanned by H. When H and S are not orthogonal to each other, there is leakage of the components of S into the orthogonal projection of y onto H. This leakage is geometrically illustrated in FIG. 1. Note in FIG. 1, that if S were orthogonal to H, then the leakage component goes to zero as is evident from equation 4. The present application addresses a solution to this leakage issue.

SUMMARY OF THE INVENTION

It is therefore an object of the present invention to provide an adaptive interference canceller that addresses the near-far problem when S is not orthogonal to H.

It is a further object to provide a communication system that will allow for the mitigation of cross channel interference.

It is yet another object to provide a communication system that will allow for the mitigation of co-channel interference.

It is yet another object to provide a communication system that will allow for the mitigation of both cross channel interference and co-channel interference.

In all of the above embodiments, it is an object to provide a communication system that will increase the gain associated with a signal of interest in relation to co-channel and/or cross-channel interference.

In all of the above embodiments, it is an object to provide a communication system that mitigates interference without conducting iterative searches that involve matrix inversions and therefore reduce the mathematical complexity of the communications system.

Finally, it is an object of the invention to provide a method of interference mitigation that utilizes a projection method to effectively cancel interference without requiring knowledge of absolute power.

According to a first broad aspect of the present invention, there is provided a communication system having a forward link comprising: a base station which transmits multiple radio frequency (RF) signals; and at least one mobile station, the mobile station including: a receiver for receiving the RF signals; means for converting the RF signal to an intermediate frequency (IF) (including baseband) signal; means for sampling the IF analog signal to generate an IF digital signal, the digital signal having a data component and an interference component; means for canceling co-channel interference in the digital signal by projecting the digital signal onto a subspace orthogonal to a subspace of the interference component and multiplying this projection with the digital signal; and means for acquisition and tracking of the projected digital signal.

According to another broad aspect of the present invention, there is provided a mobile station, the mobile station for receiving at least two RF signals from the same source and comprising: a receiver for receiving the RF signals; means for converting the RF signal to an intermediate frequency (IF) (including baseband) signal; means for sampling the IF analog signal to generate an IF digital signal, the digital signal having a data component and an interference component; means for canceling co-channel interference in the digital signal by projecting the digital signal onto a subspace orthogonal to a subspace of the interference component and multiplying this projection with the digital signal; and means for acquisition and tracking of the projected digital signal.

According to another broad aspect of the present invention, there is provided a method for receiving signals in a receiver having at least one receiver circuit, the method comprising the steps of: receiving at least two RF signals from the same source; converting the RF signals to an intermediate frequency (IF) (including baseband) signals; sampling the IF analog signals to generate IF digital signals, the digital signal having a data component and an interference component; and canceling co-channel interference in the digital signal by projecting the digital signal onto a subspace orthogonal to a subspace of the interference component and multiplying this projection with the digital signal.

According to another broad aspect of the present invention, there is provided a communication system having a reverse link comprising: at least one mobile station which transmits radio frequency (RF) signals; and at least one base station, the base station including: a receiver for receiving at least two RF signals from the mobile station; means for converting the RF signals to an intermediate frequency (IF) (including baseband) signals; means for sampling the IF analog signals to generate IF digital signals, the digital signal having a data component and an interference component; means for canceling co-channel interference in the digital signal by projecting the digital signal onto a subspace orthogonal to a subspace of the interference component and multiplying this projection with the digital signal; and means for acquisition and tracking of the projected digital signal.

According to another broad aspect of the present invention, there is provided a base station, the base station for receiving at least two RF signals from the same source and comprising: a receiver for receiving the RF signals; means for converting the RF signals to a intermediate frequency (IF) (including baseband) signals; means for sampling the IF analog signals to generate IF digital signals, the digital signal having a data component and an interference component; means for canceling co-channel interference in the digital signal by projecting the digital signal onto a subspace orthogonal to a subspace of the interference component and multiplying this projection with the digital signal; means for acquisition and tracking of the projected digital signal.

According to another broad aspect of the present invention, there is provided a method for receiving signals in a receiver having at least one receiver circuit, the method comprising the steps of: receiving at least two RF signals broadcast from one mobile receiver; converting the RF signal to an intermediate frequency (IF) (including baseband) signal; sampling the IF analog signals to generate IF digital signals, the digital signal having a data component and an interference component; and canceling co-channel interference in the digital signal by projecting the digital signal onto a subspace orthogonal to a subspace of the interference component and multiplying this projection with the digital signal.

According to another broad aspect of the present invention, there is provided a communication system having a forward link comprising: at least one base station which transmits radio frequency (RF) signals; and at least one mobile station, the mobile station including: a receiver for receiving the RF signals; means for converting the RF signal to an intermediate frequency (IF) (including baseband) signal; means for sampling the IF analog signal to generate an IF digital signal, the digital signal having a data component and an interference component; means for canceling cross-channel interference in the digital signal by projecting the digital signal onto a subspace orthogonal to a subspace of the interference component and multiplying this projection with the digital signal; and means for acquisition and tracking of the projected digital signal.

According to another broad aspect of the present invention, there is provided a mobile station, the mobile station for receiving an RF signal and comprising: a receiver for receiving the RF signals; means for converting the RF signal to an intermediate frequency (IF) (including baseband) signal; means for sampling the IF signal to generate a digital signal, the digital signal having a data component and an interference component; means for canceling cross-channel interference in the digital signal by projecting the IF signal into a subspace orthogonal to a subspace of the interference component and multiplying this projection with the digital signal; and means for acquisition and tracking of the projected digital signal.

According to another broad aspect of the present invention, there is provided a method for receiving signals in a receiver having at least one receiver circuit, the method comprising the steps of: receiving at least one RF signal; converting the RF signal to an intermediate frequency (IF) (including baseband) signal; sampling the IF analog signal to generate a digital IF signal, the digital signal having a data component and an interference component; and canceling cross-channel interference in the digital signal by projecting the digital signal onto a subspace orthogonal to a subspace of the interference component and multiplying this projection with the digital signal.

According to another broad aspect of the present invention, there is provided a communication system having a reverse link comprising: at least one mobile station which transmits radio frequency (RF) signals; and at least one base station, the base station including: a receiver for receiving the RF signals; means for converting the RF signal to an intermediate frequency (IF) (including baseband) signal; means for sampling the IF analog signal to generate a digital IF signal, the digital signal having a data component and an interference component; means for canceling cross-channel interference in the digital signal by projecting the digital signal onto a subspace orthogonal to a subspace of the interference component and multiplying this projection with the digital signal; and means for acquisition and tracking of the projected digital signal.

According to another broad aspect of the present invention, there is provided a base station, the base station for receiving at least two RF signals and comprising: a receiver for receiving the RF signals; means for converting the RF signal to an intermediate frequency (IF) (including baseband) signal; means for sampling the IF analog signal to generate a digital IF signal, the digital signal having a data component and an interference component; means for canceling cross-channel interference in the digital signal by projecting the digital signal onto a subspace orthogonal to a subspace of the interference component and multiplying this projection with the digital signal; and means for acquisition and tracking of the projected digital signal.

According to another broad aspect of the present invention, there is provided a method for receiving signals in a receiver having at least one receiver circuit, the method comprising the steps of: receiving at least one RF signal broadcast from at least one mobile receiver; converting the RF signal to an intermediate frequency (IF) (including baseband) signal; sampling the IF analog signal to generate a digital IF signal, the digital signal having a data component and an interference component; and means for canceling cross-channel interference in the digital signal by projecting the digital signal onto a subspace orthogonal to a subspace of the interference component and multiplying this projection with the digital signal.

According to another broad aspect of the present invention, there is provided a communication system having a forward link comprising: at least one base station which transmits multiple radio frequency (RF) signals; and at least one mobile station, the mobile station including: a receiver for receiving the RF signals; means for converting the RF signal to an intermediate frequency (IF) (including baseband) signal; means for sampling the analog IF signal to generate a digital IF signal, the digital signal having a data component and an interference component; and means for canceling co-channel and cross-channel interference in the digital signal by projecting the digital signal onto a subspace orthogonal to a subspace of the interference component and multiplying this projection with the digital signal; and means for acquisition and tracking of the projected digital signal.

Other objects and features of the present invention will be apparent from the following detailed description of the preferred embodiment.

BRIEF DESCRIPTION OF THE DRAWINGS

The invention will be described in conjunction with the accompanying drawings, in which.

DETAILED DESCRIPTION OF THE PREFERRED EMBODIMENT

Figure 1:
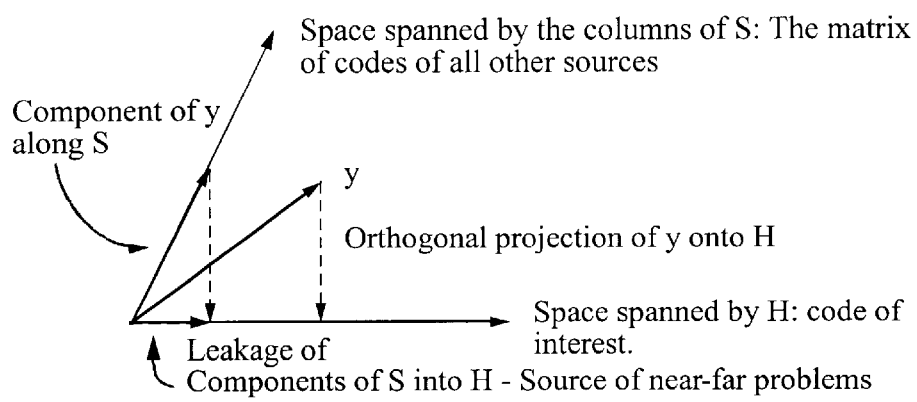
FIG. 1 is a graph illustrating the leakage of undesired source codes into the space spanned by the code of interest in a conventional coded communication system.

It is advantageous to define several terms before describing the invention. It should be appreciated that the following definitions are used throughout this application.

Definitions

Where the definition of terms departs from the commonly used meaning of the term, applicant intends to utilize the definitions provided below, unless specifically indicated.

For the purposes of the present invention, the term "cross-channel interference" refers to the type of interference that results from one source's signals bleeding into the acquisition and tracking channels of another source.

For the purposes of the present invention, the term "co-channel interference" refers to the type of interference that occurs when one or more signals, e.g., a line-of-sight signal; interferes with the ability to acquire a second, third or fourth multipath signal from the same source.

For the purposes of the present invention, the term "analog" refers to any measurable quantity that is continuous in nature.

For the purposes of the present invention, the term "base station" refers to a transmitter and/or receiver that is capable of communicating to multiple moving or stationary mobile units in a wireless environment.

For the purposes of the present invention, the term "baseline receiver" refers to a conventional receiver against which a receiver of the present invention is compared.

For the purposes of the present invention, the term "bit" refers to the conventional meaning of "bit," i.e., a fundamental unit of information having one of two possible values; a binary 1 or 0.

For the purposes of the present invention the term "code" refers to a specified sequence of numbers that is applied to a message and is known by the intended recipient of the message.

For the purposes of the present invention the term "Code-Division Multiple Access (CDMA)" refers to a method for multiple access in which all users share the same spectrum but are distinguishable from each other by a unique code.

For the purposes of the present invention, the term "chip" refers to a non-information bearing unit that is smaller than a bit, the fundamental information bearing unit. Depending on the amount of the spreading factor, fixed length sequences of chips constitute bits.

For the purposes of the present invention, the term "code offset" refers to a location within a code. For example, base stations in certain wireless environments distinguish between each other by their location within a particular pseudorandom code.

For the purposes of the present invention, the term "correlation" refers to the inner product between two signals, often scaled by the length of the signals or by another normalization factor. Correlation provides a measure of how alike two signals are.

For the purposes of the present invention, the term "digital" refers to the conventional meaning of the term digital, i.e., relating to a measurable quantity that is discrete in nature.

For the purposes of the present invention, the term "Doppler" refers to the conventional meaning of the term Doppler, i.e., shift in frequency that occurs due to movement of a receiver, transmitter and/or background.

For the purposes of the present invention, the term "Global Positioning System (GPS)" refers to the conventional meaning of this term, i.e., a satellite-based system for position location.

For the purposes of the present invention, the term "in-phase" refers to the component of a signal that is aligned in phase with a particular signal, such as a reference signal.

For the purposes of the present invention, the term "quadrature" refers to the component of a signal that is 90° out of phase with a particular signal, such as a reference signal.

For the purpose of the present invention, the term "interference" refers to the conventional meaning of the term interference, i.e., a signal that is not of interest but which interferes with the ability to detect the signal of interest. Generally, interference is structured noise that is created by other processes that are trying to do the same thing, e.g. multipath signals or mobile users communicating with other base stations.

For the purposes of the present invention, the term "linear combination" refers to the combining of multiple signals or mathematical quantities in an additive way with nonzero scaling of the individual signals.

For the purposes of the present invention, the term "matched filter" refers to a filter that is designed to facilitate the detection of a known signal by effectively correlating the received signal with an uncorrupted replica of the known signal.

For the purposes of the present invention, the term "noise" refers to the conventional meaning of noise with respect to the transmission and reception of signals, i.e., a random disturbance that interferes with the ability to detect a signal of interest. Additive noise adds linearly with the power of the signal of interest. Examples of noise in cellular systems may include automobile ignitions, power lines and microwave communication links.

For the purpose of the present invention, the term "matrix inverse" refers to the inverse of a square matrix S, denoted by $S^{-1}$, that is defined as that matrix which when multiplied by the original matrix equals the identity matrix, I, i.e., a matrix which is all zero save for a diagonal of all ones.

For the purposes of the present invention, the term "mobile" refers to a mobile phone or receiver which functions as a transmitter or receiver and communicates with base stations.

For the purposes of the present invention, the term "modulation" refers to imparting information on another signal like a sinusoidal signal or a pseudorandom coded signal. Typically, this is accomplished by manipulating signal parameters, such as phase, amplitude, frequency or some combination of these quantities.

For the purposes of the present invention, the term "multipath" refers to copies of a signal that travel different paths to the receiver.

For the purposes of the present invention, the term "normalization" refers to a scaling relative to another quantity.

For the purposes of the present invention, two nonzero vectors, $e_1$ and $e_2$ are said to be "orthogonal" if their inner product (defined as $e_1^T e_2$, where $^T$ refers to the transpose operator) is identically zero. Geometrically, this refers to vectors that are perpendicular to each other.

For the purposes of the present invention, the term "pseudorandom number (PN)" refers to sequences that are typically used in spread spectrum applications to distinguish between users while spreading the signal in the frequency domain.

For the purposes of the present invention, the term "processing gain" refers to the ratio of signal to noise ratio (SNR) of the processed signal to the SNR of the unprocessed signal.

For the purposes of the present invention, the term "projection" with respect to any two vectors x and y refers to the projection of the vector x onto y in the direction of a y with a length equal to that of the component of x, which lies in the y direction.

For the purposes of the present invention, the term "rake receiver" refers to a method for combining multipath signals in order to increase the processing gain.

For the purposes of the present invention the term "signal to noise ratio (SNR)" refers to the conventional meaning of signal to noise ratio, i.e., the ratio of the signal to noise (and interference).

For the purposes of the present invention, the term "spread spectrum" refers to techniques that use spreading codes to increase the bandwidth of a signal to more effectively use bandwidth while being resistant to frequency selective fading.

For the purposes of the present invention, the term "spreading code" refers to pseudorandom number sequences that are used to increase the width of the signal in frequency space in spread spectrum systems. Examples of spreading codes include: Gold, Barker, Walsh codes, etc.

For the purposes of the present invention, the term "steering vector" refers to a vector that contains the phase history of a signal that is used in order to focus the signal of interest.

For the purposes of the present invention, the term "symbol" refers to the fundamental information-bearing unit transmitted over a channel in a modulation scheme. A symbol may be composed of one or more bits, which can be recovered through demodulation For the purposes of the present invention, the term "transpose" refers to a mathematical operation in which a matrix is formed by interchanging rows and/or columns of another matrix. For example, the first row becomes the first column; the second becomes the second column and so on.

Description

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical, and electrical changes may be made without departing from the spirit and scope of the invention. The following detailed description is, therefore, not to be taken in a limiting sense.

A communication system includes a plurality of base stations or sources that are configured for radio communication with one or more receivers or mobile stations such as cellular telephones. The receiver/source is configured to receive and transmit direct sequence code division multiple access (DS-CDMA) signals to communicate with a plurality of base stations. The base station transmits radio frequency (RF) signals, the RF signals formed by mixing a baseband signal with an RF carrier. The baseband signal is formed by spreading data symbols with a periodic spreading sequence having a period substantially greater than the number of chips per symbol.

In a CDMA system, each source and each receiver is assigned a unique time varying code that is used to spread that source's digital bit stream. These spread signals from all sources are observed by the receiver and the received signal may be modeled as a weighted sum of the signal from each source in additive noise. The weights are the amplitudes of each source's signal and the squares of the amplitudes represent the transmission power of each source. Signals intended for other receivers appear as structured interference.

Various attempts have been made to try and reduce interference in prior art communications systems. For example, U.S. Pat. No. 6,282,233; to Yoshida, describes an apparatus for interference cancellation in parallel in which for every user at the mth stage, the interference estimation is based on interference estimating units and subtracting units based on the previous m−1 stages. It is a feedback-oriented apparatus in that each successive stage refines the previous estimate of the interference to provide more complete cancellation. Moreover, it provides for the subtraction of the interference from the received signal. However, the apparatus described by Yoshida differs from the method and system of the present invention in that the method and system of the present invention do not require a feedback-oriented refinement of the interference estimate. Also, in Yoshida, the use of weighting coefficients and the determination of a channel estimation value suggest that absolute measured power is required for cancellation. In contrast, the method and system of the present invention at most requires the relative power between the signals that comprise the received data signal. Rather than performing power estimation and attempting to remove the signal through subtraction, the method and system of the present invention provide a method and system for performing a projection operation in which the interference subspace is orthogonal to the signal space.

U.S. Pat. No. 6,278,726; to Mesecher, et al. describes interference cancellation in a spread spectrum communication system. Mesecher, et al. describes an apparatus that uses an adaptive algorithm to determine the weights of the components associated with the pilot signal to filter the received data signal to recover the data. The weights refer to the magnitude and phase of the signal. An error signal is generated based on all of the weighted recovered pilot signals. The weights are adjusted according to multiple methods that seek to minimize the error signal. The same weights are used for the data channels to compensate for channel distortion. Mesecher, et al.'s apparatus differs from the method and system of the present invention in that Mesecher, et al. seeks to mitigate interference by exploiting the increased power of the pilot channel to more accurately estimate the phase and magnitude parameters of the data channels. Apparently, this would provide the ability to better estimate replica signals for correlation purposes using various algorithms based upon the pilot signal parameters. Moreover, there is no description of subtracting or projecting out the interference as is performed in the method and system of the present invention.

U.S. Pat. No. 6,259,688 to Schilling et al. describes an apparatus that uses a subtractive interference canceller algorithm. Each channel is de-spread prior to the estimation of other channels, thereby providing a bit delay between each subsequent channel. Schilling et al.'s apparatus differs from the method and system of the present invention in that Schilling et al. relies on subtraction rather than the projection operation to remove interference. Schilling, et al.'s apparatus also appears to be dependent on estimation of the absolute channel power for accurate cancellation, whereas the method and system of the present invention relies on at most relative power between channels.

U.S. Pat. No. 6,233,229; to Ranta et al., describes a method of allocating frequency bands to different cells in a TDMA cellular system. Ranta et al.'s apparatus differs from method and system of the present invention in that Ranta et al. only uses frequency allocation in TDMA systems while the method and system of the present invention may be used in CDMA systems.

U.S. Pat. No. 6,215,812; to Young et al., describes a narrow-band interference (NBI) canceller that removes NBI at RF before it enters the receiver. Furthermore, it does not require a priori knowledge of the modulation methods employed by either the wideband direct spread spectrum signal (DSSS) or the narrowband interfering signal. The apparatus is an add-on feature that may be deployed with existing hardware. Young et al.'s apparatus differs from the method and system of the present invention in that Young et al.'s apparatus is an external add-on to the receiver that removes noise prior to the processing of the receiver while the method and system of the present invention may be an integrated part of the signal processing capability of the receiver. Moreover, the method and system of the present invention may be used to remove DSSS interferers, namely transmitters producing the same type of signal as the desired signal, while Young et al. only describes the removal of NBI.

U.S. Pat. No. 6,201,799; to Huang et al., describes an apparatus for the formation of a decorrelator receiver in which J−1 multicode (MC) channels may be cancelled from a signal containing J encoded multicode channels (where J>1). A MC CDMA receiver receives a plurality of signals and their multipath. Using a bank of RAKE receivers it is possible to generate a decision statistic for the desired data channels. A partial decorrelator processes the decision statistic for the Jth signal to suppress interference caused by the other J−1 signals. Unlike the method and system of the present invention, Huang et al. does not use any sort of projection operation.

U.S. Pat. No. 6,192,067; to Toda et al., describes an apparatus for removing interference between users and multipath interference by estimation of the interfering signals' amplitude in CDMA communication systems, particularly with digital mobile radio communication systems that use direct sequence CDMA (DS-CDMA). A decision unit executes a hard or soft decision based upon the amplitude comparisons of the received symbol vector and the estimated channel values. Toda et al. differs from the method and system of the present invention in that Toda et al.'s method relies on the absolute amplitude of the signal rather than at most the relative power, as may be done by the method and system of the present invention. Toda et al. also only suggests that Toda et al.'s method is equivalent to a subtraction type operation rather than a projection operation, such as employed by the method and system of the present invention. Moreover, Toda et al. focuses on how the interfering signals' amplitude affect the decision-making aspect of the cancellation rather than on the physics of a better cancellation method, in contrast to the method and system of the present invention that do provide a better method and system for cancellation.

U.S. Pat. No. 6,172,969; to Kawakami et al., describes an apparatus that successively estimates and cancels interference caused by the pilot (training) signal and the information signals. Kawakami et al. estimates the pilot signal and removes the interference estimated to be due to the pilot and then estimates the information signal and removes the interference estimated to be attributed to it. The process of estimating and removing interference is based upon residual signals. Kawakami et al. differs from the method and system of the present invention, in that Kawakami et al. is dependent on absolute power because the decision-making architecture depends on processing of residual signals. Moreover, unlike the method and system of the present invention, Kawakami et al. has to be serial in nature, i.e., the pilot is removed first and then the residual is used to remove the information channels.

U.S. Pat. No. 6,157,847; to Buehrer et al., describes an apparatus at the base station that performs a multi-stage filter processor in which the residual signals are passed onto subsequent stages. Buehrer et al.'s apparatus differs from the method and system of the present invention, because Buehrer et al.'s apparatus applies to the reverse-link only. Moreover, the Buehrer et al. multi-stage filter design processes residual signals, which is quite different than the current invention.

U.S. Pat. No. 6,157,685; to Tanaka et al., describes an apparatus for multibeam-antenna communication systems, such as CDMA, for interference cancellation. From the first input beam signal, a first interference replica signal is generated and the signal is subtracted. A second replica interference signal is generated with conversion coefficients and is subtracted from the signal obtained by the first interference replica signal. Each subtraction produces an error signal that is generated for each signal beam. Tanaka et al.'s apparatus differs from the method and system of the present invention in that Tanaka et al.'s apparatus relies on repeated subtraction, in contrast to the method and system of the present invention that employs subspace projection.

U.S. Pat. No. 6,154,443; to Huang, et al., describes an apparatus that computes data detection using FFT matched filters that are processed in the frequency domain by a RAKE receiver. Huang, et al's apparatus provides for a pilot signal spreading code-matched filter, a data signal spreading code-matched filter and a channel-matched filter. The latter estimates the channel frequency response and combines the received data signals from different paths before a decision is made. Huang, et al.'s apparatus differs from the method and system of the present invention in that Huang, et al.'s apparatus relies on the subtraction of interfering signals, in contrast to the method and system of the present invention that employs subspace projection.

U.S. Pat. No. 6,137,788; to Sawahashi et al., describes a serial demodulating apparatus for use in a CDMA communication system to produce a multi-stage interference canceller. Interference signal replicas are subtracted from the received signal. Sawahashi et al.'s apparatus differs from method and system of the present invention in that Sawahashi et al.'s apparatus relies on the subtraction of interference signal replicas, in contrast to the method and system of the present invention that employs subspace projection.

U.S. Pat. No. 6,115,409; to Upadhyay et al., describes an adaptive spatial-temporal system for controlling interference using beam steering (smart antenna). Each element of an N element antenna array receives a different phase-shifted version of the spread spectrum and interference signal. By filtering, it is possible to adjust the controlling weights of the antenna to null the interference signal. Upadhyay et al.'s apparatus differs from the current invention in that Upadhyay et al.'s apparatus relates specifically to beam steering techniques for N element antenna arrays whereas the method and system of the present invention employ a signal processing method of cancellation that is quite different from beam steering and applies to a larger class of CDMA systems. This approach requires multiple antennas, whereas the current invention does not, i.e. works with a single antenna.

U.S. Pat. No. 6,088,383; to Suzuki, et al., describes a spread spectrum signal demodulator to cancel interference in which replica signals are generated and subtracted from the received signal. Suzuki, et al.'s demodulator differs from the method and system of the present invention. In Suzuki, et al. the demodulator relies on power measurement for the cancellation of the replica signal, in contrast to the method and system of the present invention that employ subspace projections to suppress interference.

U.S. Pat. No. 6,014,373; to Schilling et al., describes a method for a system in which a code channel is recovered through the subtraction of interfering code channels. Each despread signal may be used in the generation of a subtracted signal which may then be used to demodulate other code channels. Schilling et al.'s method differs from the method and system of the present invention in that Schilling et al.'s method relies on the subtraction of interfering signals that have already been despread, in contrast to the method and system of the present invention that employ subspace projection.

U.S. Pat. No. 5,953,369; to Suzuki, describes a method for canceling interference by using power level information provided in data blocks transmitted in the spread spectrum signal. Suzuki's method differs from the method and system of the present invention in that Suzuki's method relies on the power level information transmitted with the spread spectrum signal. In contrast, the method and system of the present invention may be used to exploit power level information in its cancellation procedure though it is not reliant upon it.

U.S. Pat. No. 5,930,229; to Yoshida et al., describes an interference canceller apparatus for CDMA. It performs inverse spreading using a code-orthogonalization filter where the coefficients are obtained through a constraint condition process. Moreover, it detects a desired signal at a constant power level while suppressing interference waves. A tap coefficient control adaptively updates the tap coefficient according to the code-orthogonalizing filter, a reproduced carrier output from the carrier tracking circuit, a symbol decision error signal output from the adder and the desired wave spread code waveform.

The Yoshida et al. apparatus does not use a matched-filter design, but rather an orthogonalizing filter constructed as a transversal filter. The apparatus involves an adaptive method for projecting the coefficient vector onto a subspace perpendicular to the desired signal. Moreover, the Yoshida et al. filter uses orthogonal coefficients that are independent of channel variations. The filter contains a symbol decision unit that decides what the most likely transmitted symbol was. The tap coefficients are then updated recursively based on the symbol decision error signal. The mean power of the symbol decision error signal is minimized through minimum mean square error (MMSE) control. The interference cancellation may be performed adaptively and according to the changes in the spreading, timing and power of the interference signal.

As opposed to the Yoshida et al. apparatus, the present invention provides an adaptive method for projecting a signal onto a subspace orthogonal to a known interference subspace. Furthermore, the projection operator does not have any sort of convergence properties based upon a symbol decision error signal; instead it uses the best estimate of the interference that is currently being tracked in a separate finger in the receiver. No error signal is used in attempting to improve the results of the cancellation operation. The interference that may be canceled is known since it is either a signal from another transmitter or a multipath signal from the same transmitter that is currently being tracked. Another advantage of the present invention over Yoshida et al. is that there is no requirement for any MMSE control since the signals change rapidly and are currently being tracked in separate tracking loop(s). Additionally, there is no hysteresis, or critical dependence, in our calculations outside of what is performed in the tracking of the signal.

A primary difference between the Yoshida et al. disclosure and the present invention is that in the Yoshida et al. disclosure, the tap constraint processing obtains the projection of the updating coefficients vector on a constraint plane orthogonal to the desired user's chip waveform vector in a code vector space and making the sum of the projected vector and the desired user's chip waveform vector itself. Additionally, the correlation between the orthogonal code and the desired user's signal in the received signal is zero. The code vector orthogonal to the desired user's chip waveform vector is obtainable by subtracting a component from the orthogonal coefficient vector, which is formed by correlating the orthogonal coefficient code vector and desired user's chip waveform vector, normalizing the correlation with the power and re-spreading the result with the desired user's chip waveform vector. The present invention generates a projection operator that projects the received signal into a subspace orthogonal to the interference rather than orthogonal to the signal of interest. Thus, their projection is orthogonal to the signal of interest while the present invention teaches a projection that is orthogonal to the interference. Other novel features of the present invention are described below.

U.S. Pat. No. 5,872,776; to Yang, describes a method of interference cancellation that is based upon the reduction of cross-correlation interference from other signals. Yang's method employs a multi-stage processor that is implemented with two data sets required for each user with different integration times. Yang's method differs from the method and system of the present invention in that Yang's method seeks to serially decrease the cross-correlation interference. Moreover, Yang's method requires two data sets with different integration times. In contrast, the method and system of the present invention do not place that limit on the receiver and allow much easier integration into existing receiver design, e.g., CDMAOne and CDMA2000.

U.S. Pat. No. 5,787,130; to Kotzin et al., describes a technique for decoding and removing a single subscriber's signal from a composite signal. A single subscriber's signal and multipath components are determined and used to reconstruct the subscriber's signal. The reconstructed signal is then subtracted from the composite signal containing multiple subscribers. Kotzin et al.'s apparatus differs from the method and system of the present invention in that Kotzin et al's apparatus only appears to address the problem of removing one subscriber's signal and multipath. Moreover, Kotzin et al.'s apparatus uses subtraction to remove the interference, in contrast to the method and system of the present invention that employ subspace projection.

U.S. Pat. No. 6,175,587; to Madhow et al., describes a technique for interference suppression in a CDMA communications system. The Madhow et al. technique solves the problem of asynchronization (misalignment of received signal components because of multipath and path-delays because of different origins) in a different way from the present invention. Madhow et al. builds the interference matrix using left-side and right-side interference vectors to represent the symbol overlap whereas the present invention uses combined interference vectors in building interference vectors. This has major implications for two reasons: a) Madhow et al.'s cancellation cancels more of the signal of interest; b) Madhow et al.'s cancellation requires about four times the computations as the approach of the present invention. This increase in computation is partially due to the fact that the Madhow et al. patent exclusively uses the orthogonal projection of the desired code in the correlator in each finger.

The present invention primarily uses the orthogonal projection of the signal before it is fed into the appropriate finger, though in one family of receivers it may be necessary to use the orthogonal projection of the desired code in the correlator in the searcher receiver (acquisition), in the tracker, and in the final correlator, and not just in the final correlator in the finger like in the Madhow et al. approach. Implicit in the Madhow et al. approach is the assumption that any desired signal is already being acquired and tracked. The approach of the present invention covers both desired signals that are being acquired and tracked before the use of orthogonal projection, and additionally and more importantly, those that are weak and cannot be acquired and tracked without the use of the orthogonal projection operator.

In order to appreciate the significant improvements over prior art communication systems, it is essential to understand the functioning of a conventional CDMA communication system. The rudimentary functionality associated with conventional cellular systems will be described below.

Figure 2:
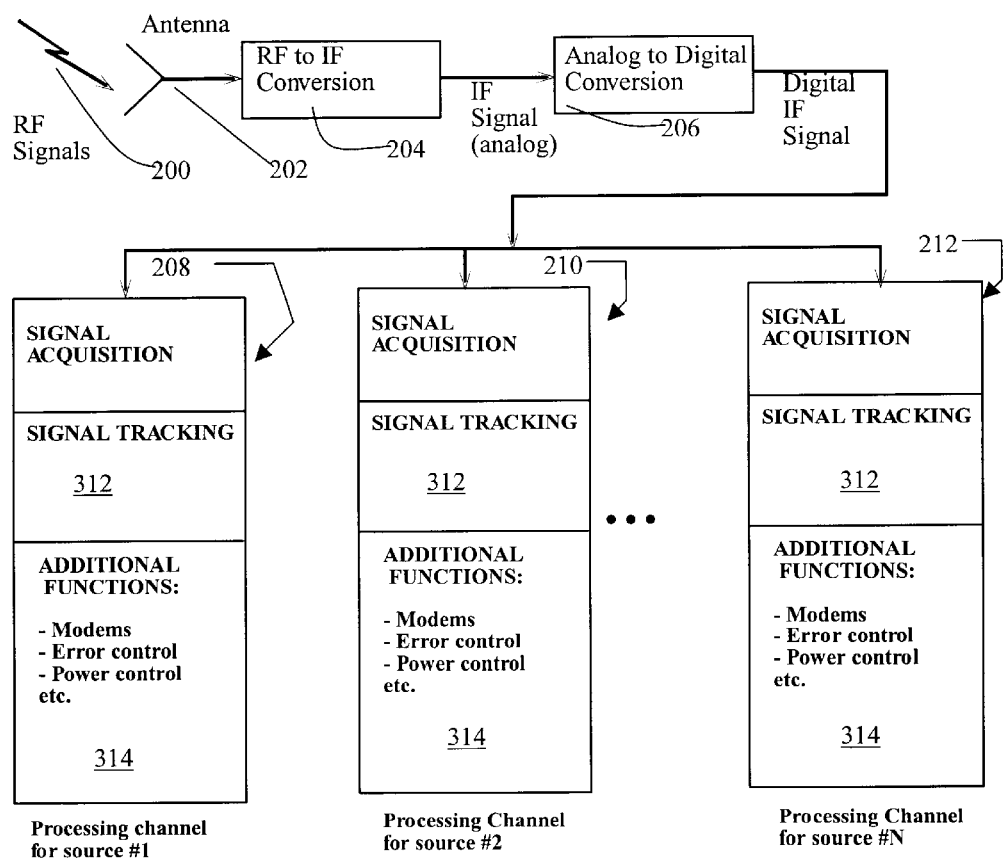
FIG. 2 is a block diagram of the processing architecture of a conventional PN coded receiver.

The processing architecture of current PN coded receivers is illustrated in FIG. 2. A PN coded signal 200 at radio frequency (RF) is received at the receiver's antenna 202. Frequency down-conversion from RF to intermediate frequency (IF) is performed by conversion circuit 204 prior to sampling and conversion from analog to digital by an A/D circuit 206. The digital IF signal is passed to a number of processing channels 208, 210 and 212 that performs the signal processing operations of acquisition and tracking. It should be appreciated that any number of signal processing channels may be utilized in conjunction with the teachings of the present invention. Note that signal acquisition performed in each processing channel may not be necessary in the implementation of the receiver. While the detailed description may include signal acquisition in each receiver finger, the invention is inclusive of receivers that do not perform signal acquisition individually in each finger. For illustrative purposes, only three channels, 208, 210, and 212 have been illustrated. Additional processing stages A, B and C may be included in each processing channel. Furthermore, in all description the signals are not decomposed into in-phase (I) and quadrature (Q) representations. However, the receiver architectures contained are inclusive of receivers that perform this decomposition and process the I and Q representations (channels) separately.

The baseline receiver converts the received signal from radio frequency (RF) signal 200 to either an intermediate frequency (IF) or baseband frequency and then discretely samples the digital signal generated by A/D circuit 206. In the detailed description, IF will be inclusive of baseband. For example, the RF reference signal is given as:

$$s_{RF}(t)=\cos(\omega_{RF}t+m) \quad (5)$$

where $\omega_{RF}$ is the RF angular frequency and m is one of the four possible values of phase in $\pi/4$-QPSK.

Effectively, the baseline receiver multiplies the received RF signal by a reference carrier to produce a signal composed of an IF or baseband component and a high frequency component.

$$s(t)=s_{RF}(t)*2\cos(\omega t)=\cos((\omega_{RF}-\omega)t+m)+\cos((\omega_{RF}+\omega)t+m) \quad (6)$$

Low-Pass Filtering removes the high frequency component and yields the analog signal $$s(t)=\cos((\omega_{RF}-\omega)t+m) \quad (7)$$

which may be discretely sampled to provide digital data.

Within each processing channel shown in FIG. 2, we focus on the signal acquisition and signal tracking functions within a channel. These functions are presented in FIG. 3 and discussed in detail, below.

Acquisition 310 is a coarse synchronization process that determines if a signal is present and if so, estimating signal parameters such as, but not limited to frequency, phase, and delay, that are supplied to the tracking loops. Typically, the acquisition process 310 produces estimates of time, or PN code offsets, and Doppler offsets. The time offset from the receiver's current time is as a result of the time of flight of the signal from the transmitter to the receiver and due to any lack of synchronization between transmitter and receiver. The Doppler offset to the frequency of the carrier is as a result of the relative velocity between the transmitter and receiver. PN code signal acquisition is essentially a search over the unknown parameters of the PN code. For our application, the unknowns are the offsets of the code, i.e., where in the entire PN code the segment of code contained in the measurement, y, resides, and the appropriate frequency of the carrier. The offset in the code is the code-offset and is also referred to as the time offset. The frequency that is estimated is the intermediate frequency plus any Doppler shifts the signal may have undergone. Even though it is likely that the Doppler shift is negligible in terrestrial systems, this assumption will not be true in the development of GLOBALSTAR and other space-based applications. Thus, the acquisition procedure is one-dimensional in nature for terrestrial systems and two-dimensional for space-based applications.

The search process involves first replicating in-phase (I) and quadrature (Q) versions of the PN code at the trial code and frequency offsets. The I and Q channels are offset in phase by 90 degrees. This replicated code is matched to the measured data y using the following integrate and dump scheme:

$$\phi_{t,f} = \sqrt{h_I^T(t,f)y + h_Q^T(t,f)} \quad (8)$$

where $h_I(t,f)$ is the I channel replicated code with code offset t and frequency offset f, $h_Q(t,f)$ is the Q channel replicated code with code offset t and frequency offset f, and $\phi_{t,f}$ is the result of the matching operation.

This process is repeated for a set of trial frequencies and code offsets and the resulting $\phi_{t,f}$ are generated. These values of $\phi_{t,f}$ are compared to a threshold $V_t$ and those that pass the threshold are noted. The values of t and f corresponding to values of Φ that exceed the threshold are the initial estimates of code offset and frequency and are passed to the tracking stage 312. The threshold in terms of single trial probability of false alarm $P_{fa}$ and measured 1-sigma noise power $\sigma_n$ may be computed in a number ways including the following formula:

$$V_t = \sigma_n \sqrt{-2\ln P_{fa}} \quad (9)$$

where $\sigma_n$ is the variance of the noise and $P_{fa}$ is the desired probability of false alarm.

For example, the initial acquisition of the strongest base station in cellular CDMA is a blind, bootstrapping procedure since no information is known while subsequent base stations may be acquired using neighbor list information to significantly shrink the search window. In IS-95 blind acquisition, a short segment (correlation length) of complex replica code is generated for all possible $2^{15}$ short code offsets in order to search the entire code sequence. A segment of the received data is then correlated with all the replica signals. A correlation peak suggests the location of the received signal in the short code. Since the Doppler frequencies encountered are minimal and generally centered around zero Hz it is possible to only do a one-dimensional search over code offsets. This initial bootstrapping procedure provides an estimate of short code offset that may be further refined through subsequent acquisition procedures.

After a base station is acquired and tracked it is possible to access the base station's neighbor list through the sync channel. The neighbor list provides nearby base stations' relative offsets and a suggested search window of (+/−N chips) to facilitate the acquisition process. The blind acquisition search is not necessary and the finger may proceed directly to the two-dimensional acquisition procedure.

Since both the blind acquisition procedure and the neighbor list limit the range of uncertainty in the code offset and the range of Doppler frequencies encountered by the mobile users is small, the two-dimensional search space is rather small. The search space is partitioned into small, rectangular regions whose dimensions are specified by Doppler bins and either chips or fractions of chips. The selection of bin size and the path through the search space is a function of the requirements for acquisition speed and reliability. Typically all code offsets are searched over a value of Doppler. If a candidate offset is not found, the search is continued in the next Doppler bin, alternating above and below the original Doppler. More sophisticated acquisition, or searching, algorithms may deviate from this systematic approach by exploiting known stochastic properties and are considered within the scope of the present invention.

Once acquisition module 310 has successfully identified a signal and its associated parameters in the data, control is transferred to tracking module 312 which may comprise two or more coupled tracking loops. In a preferred embodiment, tracking module 312 will have at least a carrier tracking loop 316 and a code tracking loop 318. The function of carrier tracking loop 316 is to track the phase and the frequency of the incoming carrier using a Phase Locked Loop (PLL) 320 for the phase and a Frequency Lock Loop (FLL) 322 for the frequency. PPL 320 may be either conventional or costas or any other method known in the signal processing art. Note that neither a PLL nor an FLL may be necessary in the implementation of the receiver. While the detailed description may include a PLL and/or an FLL, the invention is inclusive of receivers that do not use a PLL and/or an FLL.

The purpose of code tracking loop 318 is to generate a synchronized version of the PN code of the incoming signal. Code tracking loop 318 is often referred to as the Delay Lock Loop (DLL) 318.

There are a number of ways in which the FLL, PLL and/or DLL may be built to track coded signals. Regardless of the approach used, the outputs of these loops will consist of estimates of the frequency offset 324, code offset 326 and phase offset 328. For example, the Doppler, phase and offset parameters 324 through 328 are time varying due to changes in the channel, i.e., relative motion between the base station and the mobile units and changes in the surrounding environment.

Figure 4:
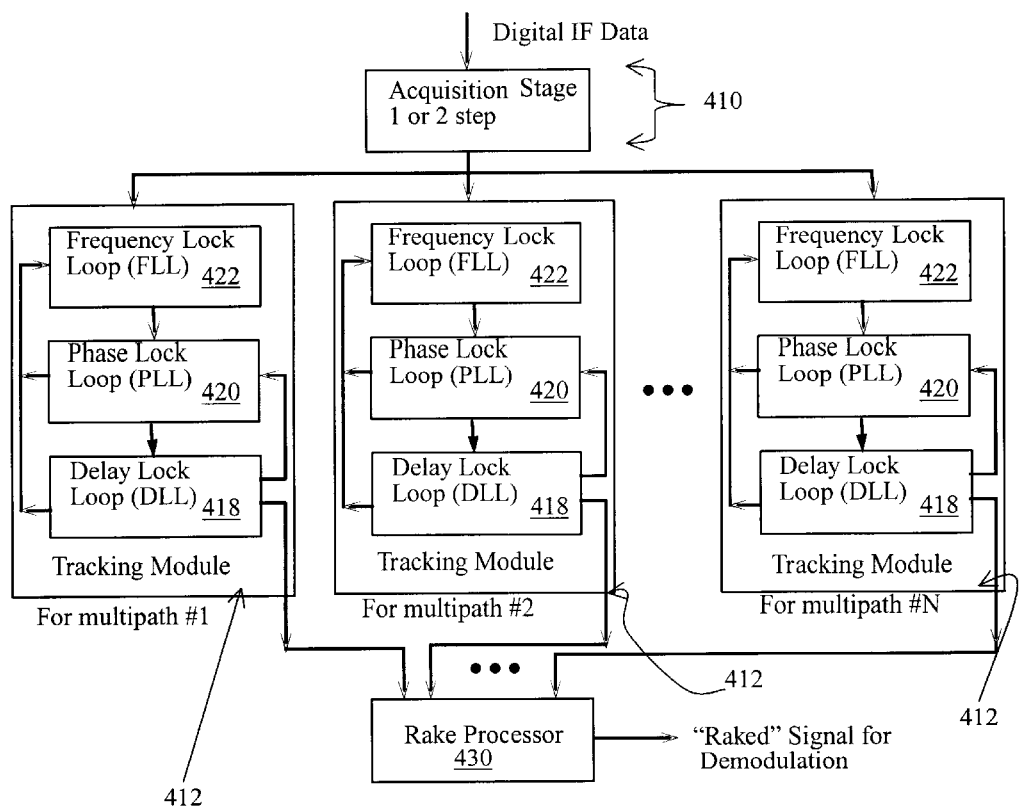
FIG. 4 is a block diagram of the acquisition and tracking modules in a conventional multipath coded receiver.

In the presence of multipath, additional copies of the signal of interest are present in the digital IF data stream that must be acquired and processed as illustrated in FIG. 4. The acquisition step 410 will detect the presence of multipath copies of the signal of interest and these multipath copies will appear as additional peaks. However, each multipath copy will be at a different code offset, phase offset and Doppler offset than the original signal. Therefore these signals have to be tracked independently in each tracking module 412. The requirement to track each multipath independently results in the need for additional tracking modules per channel. The general structure is illustrated in FIG. 4. It should be appreciated that FFL 422, PLL 420, and DLL 418 are similar to respective FFL 322, PPL 320 and DLL 318.

Figure 3:
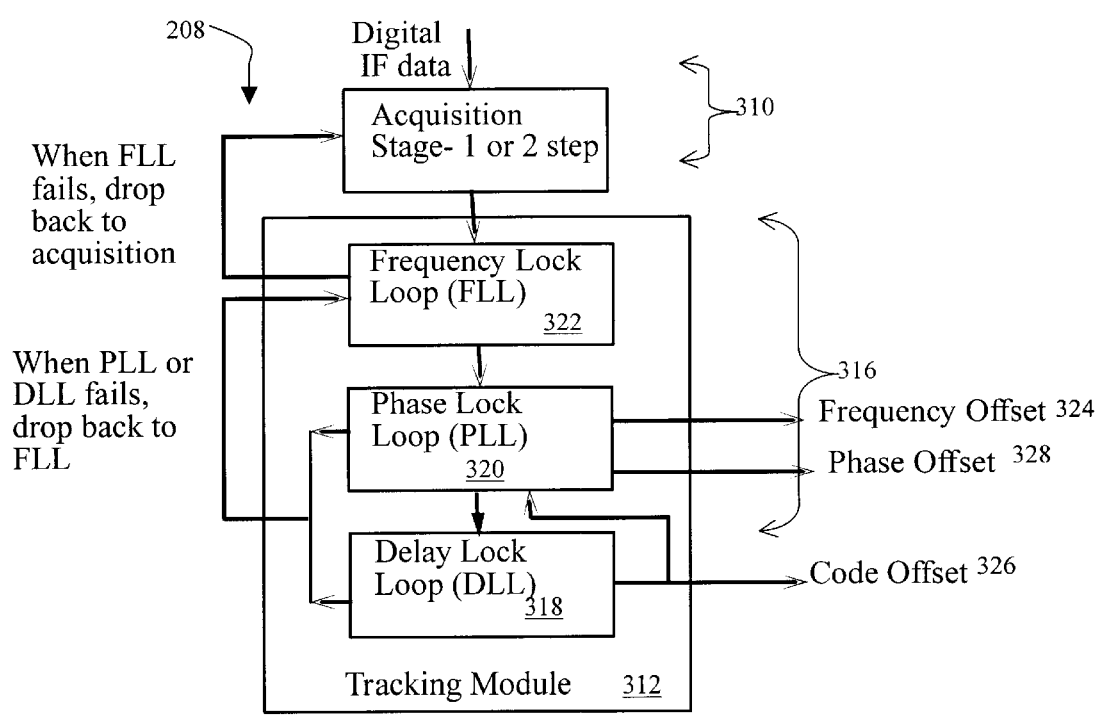
FIG. 3 is a block diagram of the acquisition and tracking modules in a conventional coded receiver.

The multipath signals are individually tracked using the tracking module described in FIG. 3. Once the time, code, phase and Doppler offsets are known, the signals are combined using a Rake processor 430. The Rake processing may be performed in a number of ways, one of which is described in Price, R. & Green, P. E., Jr. "A communication Technique for Multipath Channels," *Proc. IRE*, vol 46, pp. 555–570, March 1958; which is hereby incorporated in its entirety by reference.

There are at least two kinds of interference that may be mitigated using the method and sytem of the present invention. The first kind of interference results from one source's signals bleeding into the acquisition and tracking channels of another source. This type of interference is cross-channel interference. The second type of interference occurs when one or more signals, e.g., a line-of-sight signal, interferes with the ability to acquire a second third or fourth multipath signal from the same source. This type of interference is co-channel interference. The physics behind the leakage is described above.

In the following subsections the novel methodology for eliminating interference is described; how the novel technique applies to cross-channel and co-channel interference respectively is discussed; a novel architecture for simultaneously mitigating both cross-channel and co-channel interference is provided. In addition, different ways in which the S matrix may be built to achieve various levels of interference cancellation is also described.

Basic Explanation of Projections The following is an explanation of the use of projection operators in the present invention.

The receiver receives a signal composed of an ensemble of signals from multiple sources and their multipaths, in which data intended for a particular user is spread by a unique code. For example, in a CDMAOne system each base station broadcasts their transmissions at a different short code offset and channelization is performed within each base station's signal by orthogonal Walsh codes. The received signal vector is a discretized, i.e. digital, version of the real, analog signal received, in which each element is a value of the measured signal at a discrete instant in time. In particular, the measured signal may be represented as a sum of the signal of interest (H is a signal vector in FIG. 5) with associated amplitude, interference signals (S is an interference vector in FIG. 5) with associated amplitudes and additive noise. The vector length is arbitrary, but it could be specified as one modulated symbol sampled M times, for example.

The vectors representing the discretized signal of interest and the discretized interference signals lie within an M-dimensional space. The ensemble of linearly independent vectors of length M form a basis set that span an M-dimensional space. Thus, any point in the M-dimensional space can be represented as a linear combination of these basis vectors. For example, the vectors $[1\ 0\ 0]^T, [0\ 1\ 0]^T$ and $[0\ 0\ 1]^T$ form a three-dimensional space, e.g., the x,y,z-coordinate system. By scaling and adding these three vectors it is possible to represent any ordered triplet (x,y,z).

Depending on the mode that the present invention is operating in, a subset of interference signals are chosen to be suppressed by criteria put forth below. The subset of interference vector(s) spans an interference subspace S. The subset of interference signals is composed of signals that have been tracked in prior processing fingers in the receiver (in the case of CDMAOne, at least the pilot channel has been tracked—the other channels' parameters can be derived from the pilot). Therefore, the receiver can accurately create replica (reference) signals for each of the interfering signals at the correct phase, Doppler and spreading code(s). With the set of interference replica signals, it is possible to generate a projection operator that may be applied to the measured data to cancel these interference signals.

In general, a projection is an operation that allows one to extract a portion of interest from a composite. For example, a signal composed of many components may be operated on by an appropriately built projection operator in order to extract the component of interest. The current code-division multiple access (CDMA) systems employ a projection operator that is designed to extract the component of interest while neglecting or ignoring the other components that make up the composite. The present invention has incorporated projections that are capable of canceling some components, which are deemed to be sources of interference, while extracting the component of interest from the composite. One critical aspect of the present invention is the formulation of this projection in a way that fits very efficiently with existing architectures.

Figure 5:
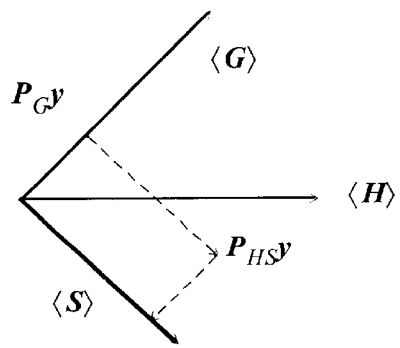
FIG. 5 is a graph illustrating the projection of a data vector onto the signal and interference subspaces in accordance with a preferred embodiment of the invention.

The projection operator, $P_S^{195}$, projects the measured signal vector, y and also referred to as $P_G y$ in FIG. 5, onto a subspace that is orthogonal to the interference subspace and is illustrated as S in FIG. 5. For example, consider a vector in an M-dimensional space. The projection operation will project the vector onto a lower dimensional space by determining the contributions of the vector in each of the dimensions in this lower-dimensional space. This can be thought of in much the same way as light projecting a three-dimensional object onto a two-dimensional plane. Effectively, this projection operation eliminates all contributions in the specified direction (note that there is no dependence on power) of the interference. The projection operator forms a subspace $P_S^\perp y$ that is orthogonal to the interference subspace S. As a result, if one attempted to project a vector in the interference subspace onto $P_S^{195}{}_y$ there would be no contribution.

Physics of Interference Mitigation

The analysis of interference mitigation is begun by considering the measurement model of equation (2). An orthogonal projection onto the space spanned by the columns of H and S may be decomposed as shown in FIG. 5.

$$P_{HS} = P_S + P_{P_S^\perp H} = P_S + P_G \qquad (10)$$

where: $P_S = S(S^T S)^{-1} S^T$, $P_{P_S^\perp H} = P_S^\perp H (H^T P_S^\perp H)^{-1} H^T P_S^\perp$ and $P_S^\perp = I - P_S$ are projection matrices, and $G = P_S^\perp H$ Next two cases of the detection problem are considered. In the first case, it is assumed that the measurement noise variance is known, while in the second case it is assumed that that the measurement for noise variance is unknown.

Case 1: Known Measurement Noise Variance

Assuming that the variance of the measurement noise is known to be $\sigma^2$, the test statistic for detecting signals in the subspace H, with interference from S is given by:

$$\phi(y) = \frac{y^T P_G y}{\sigma^2} \qquad (11)$$

Case 2: Unknown Measurement Noise Variance

The uniformly most powerful (UMP) test for detecting contribution from H, while rejecting contributions from S, when the measurement noise variance is unknown, has been derived in the literature and is given by:

$$\phi(y) = \frac{y^T P_G y}{y^T P_S^\perp P_G^\perp P_S^\perp y} \qquad (12)$$

The key idea in prior art teachings is to project the measurement y on to the space G and to perform the detection test in G. This projection onto G may be viewed in the following equivalent ways: parallel to the space S, perpendicular to the space that is perpendicular to S, and oblique to the space H. The method and system of the present invention may be used to extend these ideas to mitigate both the cross-channel and co-channel interference.

Cross-Channel Interference Mitigation

Cross-channel interference mitigation requires that contributions from other sources and all their multipath copies must be eliminated from the channel of the source of interest. Therefore, the matrix S must contain the signals or a portion of the signals of the interfering sources at the correct code, phase and Doppler offsets. In order to clarify how the codes are arranged in the matrix S, what happens when an interfering source is acquired and is being tracked will now be considered.

Figure 6:
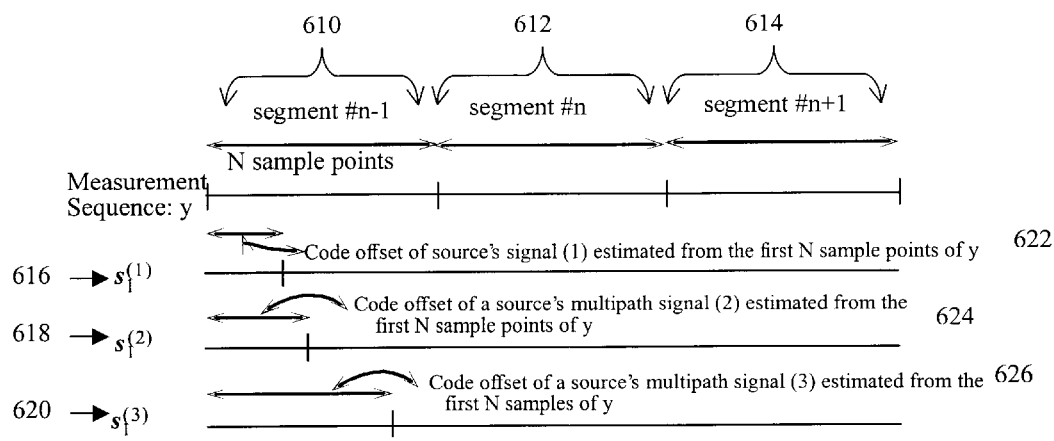
FIG. 6 depicts multipath data signals and alignment issues.

As shown in FIG. 6, the Doppler, code and phase offset of each code is determined for the integration period of length N that is under consideration. For example, three vectors 610, 612, 614 of length N are provided as input to the structure in FIG. 7, and the output of this structure is the code, phase and Doppler offset of each multipath copy of the signal under consideration 616, 618, 620, respectively. Some physical insight to this process may be seen in FIG. 6.

As shown in FIG. 6, for each segment of N sample points of y, i.e., 610, 612, 614, the various multipaths are offset by some amount 622, 624, 626, respectively. For example, for segment 610 of N sample points of y, the structure in FIG. 7 estimates the code offsets shown in FIG. 6 prior to the Rake process 730. Assuming that the multipath structure does not change dramatically in the segment under consideration and the next couple of segments, one may use the offsets (in code, phase and Doppler), to infer the segments of the code that are present in segments 612, 614 and beyond. It is these segments that are used to build the S matrix as needed for segments 610, 612, 614, etc.

Given the codes of the interfering sources and their multipath signals assembled in the matrix S, there are many ways in which the matrix S may be used to eliminate the interference. These techniques are outlined below.

Method 1 for Interference Mitigation

The acquisition and tracking steps of the standard approach for interference mitigation has involved performing a correlation with the replica of the code at the selected code, phase and Doppler offsets. The result is squared and compared to a threshold in the acquisition stage. The result is also used to track the frequency, phase and code offsets by comparing the angle between the real and imaginary parts in the tracking stage. The key point is that both the acquisition and tracking involve correlating the measurement y with a replica of the code. The essence of Method 1 is to replace the standard correlation process with equation (11). In order to see how such a replacement is achieved, the projection matrix PG may be used:

$$P_G = G(G^T G)^{-1} G^T \quad (13)$$

where $G = P_S^{-1} h$, S is the matrix of interference codes and h is the replicated code of the source of interest. Since projection matrices are idempotent:

$$P_G P_G = P_G \quad (14)$$

One may replace the correlation with replicated code in the standard receiver with the following operation:

$$z = P_G y \quad (15)$$

Squaring the result z yields the following:

$$z^T z = (P_G y)^T P_G y = y^T P_G y \quad (16)$$

Note the fact that PG is a symmetric and idempotent matrix has been exploited.

The result in equation (16) is just the numerator of equation (11). The denominator is merely the variance of the noise which is assumed to be known a priori. Of course, in practice the noise covariance must be estimated. This variance may be estimated using variance estimation that is a part of the threshold creation in equation (8). Of course, when the variance is computed, equations (15) and (16) are used but with an arbitrary h or replicated code.

The correlation process of the present invention may be used to replace the standard correlation that is used in the current acquisition and tracking implementations.

Method 2 for Interference Mitigation

An alternative procedure involves running the correlation as an unnormalized process which involves merely performing the computations in equations (15) and (16). Next, rather than normalizing by an estimate of the variance, one computes the threshold directly as shown in equation (8). Once again, one would use equations (15) and (16) to compute the variance but with arbitrary replicated codes.

Method 3 for Interference Mitigation

The next method involves replacing the standard estimate of the noise variance with the denominator of equation (12).

Method 4 for Interference Mitigation

Another method is identical to method 2 with the threshold computed as shown in equation (8), except that the variance in equation (6) is replaced with the denominator in equation (12).

Method 5 for Interference Mitigation

A method for interference suppression involves breaking up the projection matrix $P_G$ into a sequence of unnormalized computations. Computing the ratio of the in-phase and quadrature components in the tracking stages cancels any scale factor that result from the lack of normalization, while computing an appropriately adjusted threshold that will account for the lack of normalization in the acquisition stage. This is currently done in today's mobile phones, base-stations, GPS receivers, etc.

Recall that the projection matrix $P_G$ is a projection onto the component of h that lies in the space orthogonal to S. Therefore the numerator term $y^T P_G y$ may be decomposed as follows:

$$\begin{aligned} y^T P_G y &= y^T G(G^T G)^{-1} G^T y \\ &= y^T G(G^T G)^{-1/2} (G^T G)^{-1/2} G^T y \\ &= \left((G^T G)^{-1/2} G^T y\right)^T (G^T G)^{-1/2} G^T y \end{aligned} \quad (17)$$

The final form of the numerator term in the above equation implies that a segment of y is operated on by the term $(G^T G)^{-1/2} G^T$. The result is then squared to compute $y_T P_G y$. Clearly, the term that is applied to the segment y is normalized, where the normalization term is $(G^T G)^{-1/2}$. In our approach, the result is modified and an unnormalized operation is performed on the measurement segment, y, by eliminating the term $(G^T G)^{-1/2}$. The resulting operation on y is given by:

$$z = G^T y \quad (18)$$

Recall that $G = P_S^{-1} h$ and therefore z from the above equation may be re-written:

$$z = h^T P_S^{-1} y \quad (19)$$

Let us apply the following definition to the above equation for z:

$$\tilde{y} = P_S^{-1} y \quad (20)$$

Therefore, the operation in equation (16) may be re-written:

$$z = h^T P_S^{-1} y = h^T \tilde{y} \quad (21)$$

Thus, the process involves first computing $\tilde{y} = P_S^{-1} y$, and then passing this result onto the standard acquisition and tracking stages. The standard acquisition and tracking stages already correlate the input with h, which is the replicated code of the source of interest. In doing so, the acquisition and tracking stages compute equation (21). This process is illustrated in FIG. 7.

The architecture depicted in FIG. 7 works in the following way. Assume that the receiver acquires and tracks the signal from one of the sources. At this point, that source's information 700, i.e., the code, phase and Doppler offsets of that source's signal as well as all the multipaths, are used to build the matrix S in 702. This matrix is fed to all the other source's channels. Those other source's channels use the matrix S to build $P_S^\perp$ 704. The subsequent operations for that source proceed as shown in FIG. 7. Once a second source is acquired and is being tracked, that sources information is also added to the matrix S for all the sources and so on. This process is continued until all the sources (or at a minimum, all the offending sources, e.g. the source broadcasting relatively higher powers) have their information used to build the matrix S in 702. Of course, a source's own information is not used in the S matrix for that source's channel. Therefore, the S matrix for each source is different and only contains the information of the other sources in the system—either composed of the interference signal or portions of the signal. Co-channel interference mitigation 712 may also be mitigated by using the techniques described here. The approach is to include in the S matrix a portion of the signal, i.e., the source's own code at the right code, phase and Doppler offsets for each offending multipath. By including the source's own codes in this way, the receiver may acquire and track additional multipath signals that otherwise may have been buried in the interference.

Simultaneous cross-channel and co-channel interference mitigation may be achieved by including in the S matrix all the interfering signals or portions of the signals at the correct code, Doppler and phase offsets. All of the techniques for interference mitigation would apply in this modification of the matrix S.

Figure 7:
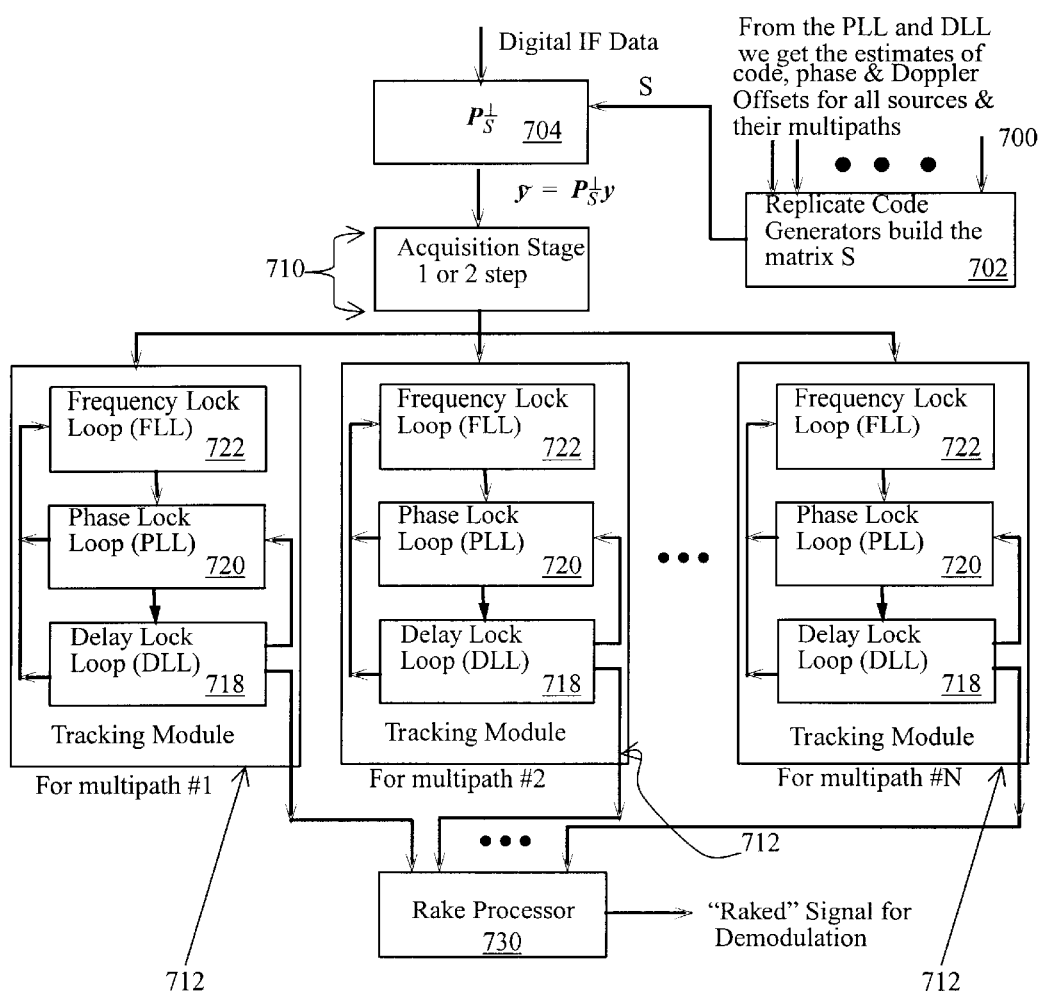
FIG. 7 depicts the cross-channel interference mitigation architecture.
Figure 8:
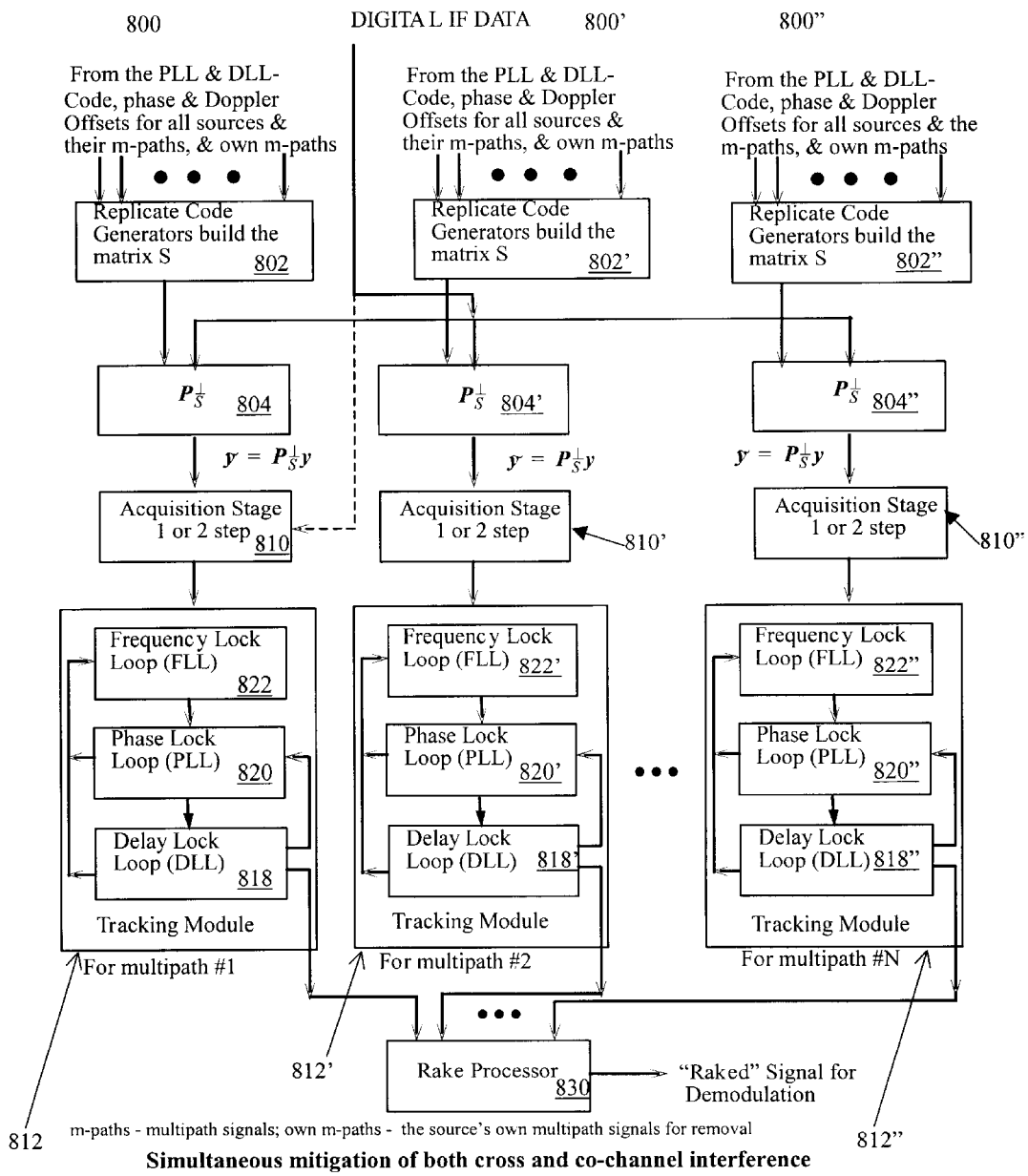
FIG. 8 depicts the simultaneous co-channel and cross-channel interference mitigation architecture.

In the FIG. 8, it is demonstrated how the process in FIG. 7 may be enhanced to null both co-channel and cross-channel interference.

The operation of the structure illustrated in FIG. 8. In FIG. 8 the architectural layout is presented of a single data processing channel for eliminating both cross-channel and co-channel interference. A single data processing channel is designed to acquire and track the signal from a single source.

In the architecture presented, the single data processing channel consists of multiple fingers 800, 800' and 800" where each finger consists of a code generation module 802, 802' and 802"(for building the S matrix); $P_S^\perp$ modules 804, 804' and 804"; an acquisition module 810, 810', and 810" and a tracking module 812, 812' and 812". The tracking module, of course, consists of FLLs 822, 822' and 822"; PLLs 820, 820' and 820"; as well as DLLs 818, 818' and 818". Each processing finger 800, 800' and 800" within a channel has the function of acquiring and tracking a distinct multipath signal from the same source.

In order to understand how the architecture depicted in FIG. 8 works, the starting assumption may be used that this channel has just been assigned to track the signals from a particular source and that the system is already in the process of acquiring and tracking other sources.

The input data to this channel arrives in the form of a digital IF data stream. Since there are other sources being tracked, the replicate code generator module 802, 802' and 802" would generate the appropriate S matrix and this matrix is used to create $P_S^\perp$ 804, 804' and 804". In this case, the digital IF data stream y is provided as input into the $P_S^\perp$ module. The output of this module 804 is fed into the acquisition module 810 in the same finger.

In case the system was not tracking any other sources, then there would be no S matrix generated and therefore no $P_S^\perp$ function. In this case, the input digital IF data stream is passed directly into the acquisition stage.

The acquisition stage acquires the signal and all its multipath copies from the source of interest. If the acquisition stage identifies more than one multipath, then multiple tracking sections are used for each multipath signal individually. The outputs of the tracking stages 812, 812' and 812" are the code, phase, and Doppler offsets that are used to build the S in the other channels. Thus far, the process is identical to that described in FIG. 7. Furthermore, if all the available processing tracks are consumed, there is no need to mitigate any co-channel interference.

Now suppose that due to co-channel interference, the acquisition stage 810 was only able to acquire fewer multipaths than there are available processing fingers, i.e., the other multipath signals are buried in the co-channel interference. In that case, the information from the acquisition stage is used to track the first signals identified. The information about the code, phase and Doppler offsets of the first signals being tracked are obtained from the tracking system 812 and are provided as input into the replicate code generator modules 802' and 802".

The S matrix built in this finger now has included in it the code of the lone signal being processed in the finger 800. As a result, the finger 800' will eliminate interference from all the other sources as well as the dominant signal from the source of interest. The acquisition module 810' in this finger then acquires the multipath signal which is now visible because the interference from the dominant signal has been eliminated. That multipath is then tracked in 812' and the tracking information is provided to both the finger 800 (to improve its ability to track the dominant signal) as well as to the other fingers, e.g., 800" to aid in finding additional weak multipath signals. The tracking information from all these modules are used to perform the Rake operation 830 for data demodulation.

Although the present invention has been fully described in conjunction with the preferred embodiment thereof with reference to the accompanying drawings, it is to be understood that various changes and modifications may be apparent to those skilled in the art. Such changes and modifications are to be understood as included within the scope of the present invention as defined by the appended claims, unless they depart therefrom.

What is claimed is:

1. A communication system having a forward link comprising:
   a base station which transmits multiple radio frequency (RF) signals; and
   at least one mobile station, said mobile station including:
      a receiver for receiving said RF signals;
      means for converting said RF signal to an intermediate frequency (IF) analog signal;
      means for sampling said IF analog Signal to generate a digital IF signal, said digital signal having a data component and an interference component;
      means for canceling co-channel interference in said digital signal by projecting said digital signal onto a subspace orthogonal to a subspace of said interference component and multiplying this projection with said digital signal; and
      means for acquisition and tracking of said projected digital signal.

2. The communication system recited in claim 1, wherein said intermediate frequency (IF) analog signal includes base band.

3. The communication system recited in claim 1, wherein said receiver comprises multiple fingers.

4. The communication system recited in claim 3, wherein said data component from one finger is treated as interference in at least one other finger of said multiple fingers.

5. The communication system recited in claim 3, wherein said data component from a first finger is treated as interference in at least a second finger of said multiple fingers.

6. The communication system recited in claim 5, wherein said data component from said first and second fingers are treated as interference in at least one other finger of said multiple fingers.

7. A mobile station, said mobile station for receiving at least two radio frequency (RF) signals from the same source and comprising:
 a receiver for receiving said RF signals;
 means for converting said RF signal to an intermediate frequency (IF) analog signal;
 means for sampling said IF analog Signal to generate a digital IF signal, said digital signal having a data component and an interference component;
 means for canceling co-channel interference in said digital signal by projecting said digital signal onto a subspace orthogonal to a subspace of said interference component and multiplying this projection with said digital signal; and
 means for acquisition and tracking of said projected digital signal.

8. The mobile station recited in claim 7, wherein said intermediate frequency (IF) analog signal includes base band.

9. The mobile station recited in claim 7, wherein said receiver comprises multiple fingers.

10. The mobile station recited in claim 9, wherein said data component from one finger is treated as interference in at least one other finger of said multiple fingers.

11. The mobile station recited in claim 10, wherein said data component from a first finger is treated as interference in at least a second finger of said multiple fingers.

12. The mobile station recited in claim 11, wherein said data component from said first and second fingers are treated as interference in at least one other finger of said multiple fingers.

13. A method for receiving signals in a receiver having at least one receiver circuit, the method comprising the steps of:
 receiving at least two radio frequency (RF) signals from the same source;
 converting said RF signal to an intermediate frequency (IF) analog signal;
 sampling said IF analog Signal to generate a digital IF signal, said digital signal having a data component and an interference component; and
 canceling co-channel interference in said digital signal by projecting said digital signal onto a subspace orthogonal to a subspace of said interference component and multiplying this projection with said digital signal.

14. The method recited in claim 13, further comprising the steps of repeating the above steps for each finger in said receiver.

15. The method recited in claim 14, wherein said data component from one finger of said receiver is treated as interference in at least one other finger of said multiple fingers.

16. The method recited in claim 14, wherein said data component from said first and second fingers are treated as interference in at least one other finger of said multiple fingers.

17. A communication system having a reverse link comprising:
 at least one mobile station which transmits radio frequency (RF) signals; and
 at least one base station, said base station including:
  a receiver for receiving at least two RF signals from said mobile station;
  means for converting said RF signal to an intermediate frequency (IF) analog signal;
  means for sampling said IF analog Signal to generate a digital IF signal, said digital signal having a data component and an interference component;
  means for canceling co-channel interference in said digital signal by projecting said digital signal onto a subspace orthogonal to a subspace of said interference component and multiplying this projection with said digital signal; and
  means for acquisition and tracking of said projected digital signal.

18. The communication system recited in claim 17, wherein said intermediate frequency (IF) analog signal includes base band.

19. The communication system recited in claim 17, wherein said receiver comprises multiple fingers.

20. The communication system recited in claim 19, wherein said data component from one finger is treated as interference in at least one other finger of said multiple fingers.

21. The communication system recited in claim 19, wherein said data component from a first finger is treated as interference in at least a second finger of said multiple fingers.

22. The communication system recited in claim 21, wherein said data component from said first and second fingers are treated as interference in at least one other finger of said multiple fingers.

23. A base station, said base station for receiving at least two radio frequency (RF) signals from the same source and comprising:
 a receiver for receiving said RF signals;
 means for converting said RF signal to an intermediate frequency (IF) analog signal;
 means for sampling said IF analog Signal to generate a digital IF signal, said digital signal having a data component and an interference component;
 means for canceling co-channel interference in said digital signal by projecting said digital signal onto a subspace orthogonal to a subspace of said interference component and multiplying this projection with said digital signal; and
 means for acquisition and tracking of said projected digital signal.

24. The base station recited in claim 23, wherein said intermediate frequency (IF) analog signal includes base band.

25. The base station recited in claim 23, wherein said receiver comprises multiple fingers.

26. The base station recited in claim 25, wherein said data component from one finger is treated as interference in at least one other finger of said multiple fingers.

27. The base station recited in claim 26, wherein said data component from a first finger is treated as interference in at least a second finger of said multiple fingers.

28. The base station recited in claim 27, wherein said data component from said first and second fingers are treated as interference in at least one other finger of said multiple fingers.

29. A method for receiving signals in a receiver having at least one receiver circuit, the method comprising the steps of:

receiving at least two radio frequency (RF) signals broadcast from one mobile receiver;

converting said RF signal to an intermediate frequency (IF) analog signal;

sampling said IF analog Signal to generate a digital IF signal, said digital signal having a data component and an interference component; and canceling co-channel interference in said digital signal by projecting said IF digital signal onto a subspace orthogonal to a subspace of said interference component and multiplying this projection with said digital signal.

30. The method recited in claim 29, further comprising the steps of repeating the above steps for each finger in said receiver.

31. The method recited in claim 30, wherein said data component from one finger of said receiver is treated as interference in at least one other finger of said multiple fingers.

32. The method recited in claim 30, wherein said data component from first and second fingers are treated as interference in at least one other finger of said multiple fingers.

33. A communication system having a forward link comprising:

at least one base station which transmits radio frequency (RF) signals; and at least one mobile station, said mobile station including:
    a receiver for receiving said RF signals;
    means for converting said RF signal to an intermediate frequency (IF) analog signal;
    means for sampling said IF analog Signal to generate an IF digital signal, said digital signal having a data component and an interference component;
    means for canceling cross-channel interference in said digital signal by projecting said digital signal onto a subspace orthogonal to a subspace of said interference component and multiplying this projection with said digital signal; and
    means for acquisition and tracking of said projected digital signal.

34. The communication system recited in claim 33, wherein said intermediate frequency (IF) analog signal includes base band.

35. The communication system recited in claim 33, wherein said receiver comprises multiple fingers.

36. The communication system recited in claim 35, wherein said data component from one finger is treated as interference in at least one other finger of said multiple fingers.

37. The communication system recited in claim 35, wherein said data component from a first finger is treated as interference in at least a second finger of said multiple fingers.

38. The communication system recited in claim 37, wherein said data component from said first and second fingers are treated as interference in at least one other finger of said multiple fingers.

39. A mobile station, said mobile station for receiving a radio frequency (RF) signal and comprising:

a receiver for receiving said RF signals;
means for converting said RF signal to an intermediate frequency (IF) analog signal;
means for sampling said IF analog Signal to generate a digital IF signal, said digital signal having a data component and an interference component;
means for canceling cross-channel interference in said digital signal by projecting said digital signal onto a subspace orthogonal to a subspace of said interference component and multiplying this projection with said digital signal; and
means for acquisition and tracking of said projected digital signal.

40. The mobile station recited in claim 39, wherein said intermediate frequency (IF) analog signal includes base band.

41. The mobile station recited in claim 39, wherein said receiver comprises multiple fingers.

42. The mobile station recited in claim 41, wherein said data component from one finger is treated as interference in at least one other finger of said multiple fingers.

43. The mobile station recited in claim 42, wherein said data component from a first finger is treated as interference in at least a second finger of said multiple fingers.

44. The mobile station recited in claim 43, wherein said data component from said first and second fingers are treated as interference in at least one other finger of said multiple fingers.

45. A method for receiving signals in a receiver having at least one receiver circuit, the method comprising the steps of:

receiving at least one radio frequency (RF) signal;
converting said RF signal to an intermediate frequency (IF) analog signal;
sampling said IF analog Signal to generate a digital IF signal, said digital signal having a data component and an interference component; and
canceling cross-channel interference in said digital signal by projecting said digital signal onto a subspace orthogonal to a subspace of said interference component and multiplying this projection with said digital signal.

46. The mobile station recited in claim 45, wherein said intermediate frequency (IF) analog signal includes base band.

47. The mobile station recited in claim 45, wherein said receiver comprises multiple fingers.

48. The method recited in claim 45, further comprising the steps of repeating the above steps for each finger in said receiver.

49. The method recited in claim 46, wherein said data component from one finger of said receiver is treated as interference in at least one other finger of said multiple fingers.

50. The method recited in claim 46, wherein said data component from first and second fingers are treated as interference in at least one other finger of said multiple fingers.

51. A communication system having a reverse link comprising:

at least one mobile station which transmits radio frequency (RF) signals; and at least one base station, said base station including:
    a receiver for receiving said RF signals;
    means for converting said RF signal to an intermediate frequency (IF) analog signal;
    means for sampling said IF analog Signal to generate a digital IF signal, said digital signal having a data component and an interference component;
    means for canceling cross-channel interference in said digital signal by projecting said digital signal onto a subspace orthogonal to a subspace of said interference component and multiplying this projection with said digital signal; and means for acquisition and tracking of said projected digital signal.

52. The communication system recited in claim 51, wherein said intermediate frequency (IF) analog signal includes base band.

53. The communication system recited in claim 51, wherein said receiver comprises multiple fingers.

54. The communication system recited in claim 53, wherein said data component from one finger is treated as interference in at least one other finger of said multiple fingers.

55. The communication system recited in claim 53, wherein said data component from a first finger is treated as interference in at least a second finger of said multiple fingers.

56. The communication system recited in claim 55, wherein said data component from said first and second fingers are treated as interference in at least one other finger of said multiple fingers.

57. A base station, said base station for receiving at least two radio frequency (RF) signals and comprising:

a receiver for receiving said RF signals;

means for converting said RF signal to an intermediate frequency (IF) analog signal;

means for sampling said IF analog Signal to generate a digital IF signal, said digital signal having a data component and an interference component;

means for canceling cross-channel interference in said digital signal by projecting said digital signal onto a subspace orthogonal to a subspace of said interference component and multiplying this projection with said digital signal; and means for acquisition and tracking of said projected digital signal.

58. The base station recited in claim 57, wherein said intermediate frequency (IF) analog signal includes base band.

59. The base station recited in claim 57, wherein said receiver comprises multiple fingers.

60. The base station recited in claim 59, wherein said data component from one finger is treated as interference in at least one other finger of said multiple fingers.

61. The base station recited in claim 60, wherein said data component from a first finger is treated as interference in at least a second finger of said multiple fingers.

62. The base station recited in claim 61, wherein said data component from said first and second fingers are treated as interference in at least one other finger of said multiple fingers.

63. A method for receiving signals in a receiver having at least one receiver circuit, the method comprising the steps of:

receiving at least one radio frequency (RF) signal broadcast from at least one mobile receiver;

converting said RF signal to an intermediate frequency (IF) analog signal;

sampling said IF analog Signal to generate a digital IF signal, said digital signal having a data component and an interference component; and means for canceling cross-channel interference in said digital signal by projecting said digital signal onto a subspace orthogonal to a subspace of said interference component and multiplying this projection with said digital signal.

64. The method recited in claim 63, further comprising the steps of repeating the above steps for each finger in said receiver.

65. The method recited in claim 64, wherein said data component from one finger of said receiver is treated as interference in at least one other finger of said multiple fingers.

66. The method recited in claim 64, wherein said data component from first and second fingers are treated as interference in at least one other finger of said multiple fingers.

67. A communication system having a forward link comprising:

at least one base station which transmits multiple radio frequency (RF) signals; and at least one mobile station, said mobile station including:
a receiver for receiving said RF signals;

means for converting said RF signal to an intermediate frequency (IF) analog signal;

means for sampling said IF analog Signal to generate a digital IF signal, said digital signal having a data component and an interference component; and means for canceling co-channel and cross-channel interference in said digital signal by projecting said digital signal onto a subspace orthogonal to a subspace of said interference component and multiplying this projection with said digital signal; and means for acquisition and tracking of said projected digital signal.

68. The communication system recited in claim 67, wherein said intermediate frequency (IF) analog signal includes base band.

69. The communication system recited in claim 67, wherein said receiver comprises multiple fingers.

70. The communication system recited in claim 69, wherein said data component from one finger is treated as interference in at least one other finger of said multiple fingers.

71. The communication system recited in claim 69, wherein said data component from a first finger is treated as interference in at least a second finger of said multiple fingers.

72. The communication system recited in claim 71, wherein said data component from said first and second fingers are treated as interference in at least one other finger of said multiple fingers.

* * * * *